(No Model.)

H. SANTROCK
GRAIN DRILL.

No. 263,434. Patented Aug. 29, 1882.

Witnesses
F. L. Ouraud
L. L. Miller

Inventor.
Henry Santrock,
per Chas. H. Fowler,
Attorney.

UNITED STATES PATENT OFFICE.

HENRY SANTROCK, OF CEDARVILLE, KANSAS.

GRAIN-DRILL.

SPECIFICATION forming part of Letters Patent No. 263,434, dated August 29, 1882.

Application filed December 22, 1881. (No model.)

*To all whom it may concern:*

Be it known that I, HENRY SANTROCK, a citizen of the United States, residing at Cedarville, in the county of Smith and State of Kansas, have invented certain new and useful Improvements in Grain-Drills; and I do hereby declare that the following is a full, clear, and exact description of the same, reference being had to the annexed drawings, making a part of this specification, and to the letters and figures of reference marked thereon.

Figure 1:
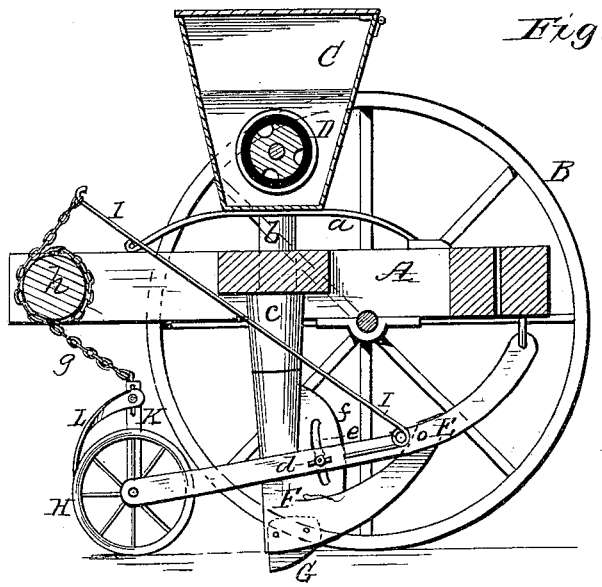
Figure 2:
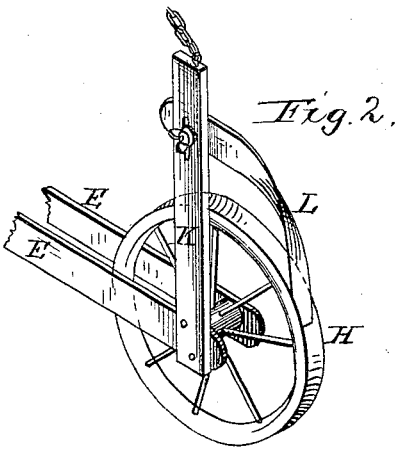

Figure 1 of the drawings is a sectional elevation of a grain-drill embodying my invention, and Fig. 2 a detail view, in perspective, of the gage-wheel and scraper.

The present invention has relation to grain-drills, and is designed as an improvement on my former patent bearing date October 19, 1880, No. 233,439.

The invention consists in certain new and useful improvements, as illustrated in the drawings, and hereinafter described.

In the accompanying drawings, A represents the frame of the grain-drill, supported upon wheels B in the usual manner, and having the seed-hopper C, containing the rotary feeder D, said hopper being supported upon spring $a$, and connecting with a series of discharge-tubes, $b$, each of which connects with a flexible hose, $c$. These several parts as above referred to do not differ materially from those shown in my former patent, and therefore further description of them is deemed unnecessary, as my invention is equally applicable to grain-drills of the usual construction.

To the frame A are hinged or otherwise suitably connected forked brace-arms E, to which is secured by a bolt or other desirable means the shoe F. This shoe F has removably or detachably connected to it by suitable bolts a cutter, G, so that it can be taken out by removing bolts for the purpose of sharpening or repairing.

A bolt, $d$, passes through the arms E and through an elongated slot, $e$, in a plate, $f$, thereby enabling the arms E to be adjusted vertically, so as to regulate the height of the wheel H in accordance to the depth the grain is desired to be placed in the ground.

A spring, I, is secured to the arms E, and regulates the pressure to be brought upon the shoe F and wheel H.

The arms E extend a sufficient distance beyond the shoe F to form braces for the wheel H upon each side thereof. When the screw-bolt $d$ is loosened the arms E are free to be moved up or down for the purpose of placing the grain deep or shallow in the ground.

To the rear end of one of the braces E is firmly secured a standard, K, having adjustably and removably connected thereto a scraper, L, thereby enabling the periphery of the wheel to be cleaned when found necessary, the same being concave for the purpose of pressing the earth from the sides to the center, covering the grain, thereby leaving a smooth convex track to prevent the water from settling immediately around the spears of the grain and preventing injury by frost.

To the upper end of the standard K is connected one end of a chain, $g$, which passes around a roller, $h$, the other end of the chain being secured to the free end of the spring I. The lower end of the chain $g$, being attached to the standard K, raises or lowers the shoe and wheel, as in my former patent; but in place of connecting the opposite end of the chain to the roller it is secured to the end of the spring I, throwing the pressure on shoe or wheel, owing to the motion of the roller $h$.

Having now fully described my invention, what I claim as new, and desire to secure by Letters Patent, is—

1. In a grain-drill, the combination, with the brace-arms E, of the shoe F, carrying removable cutter G, and slotted plate $f$, and the bolt $d$, constructed and arranged substantially as and for the purpose set forth.

2. In a grain-drill, the shoe F, carrying cutter G, adjustable brace-arms E, spring I, and wheel H, in combination with the removable scraper L, chain $g$, and roller $h$, one end of said chain being connected to the standard K and passing around the roller, while the opposite end is secured to the spring I, substantially as and for the purpose specified.

In testimony that I claim the above I have hereunto subscribed my name in the presence of two witnesses.

HENRY SANTROCK.

Witnesses:
CHAS. E. DON CARLOS,
WM. C. DON CARLOS.